No. 618,940.    J. W. HILE.    Patented Feb. 7, 1899.
GASOLENE LAMP.
(Application filed May 7, 1898.)
(No Model.)
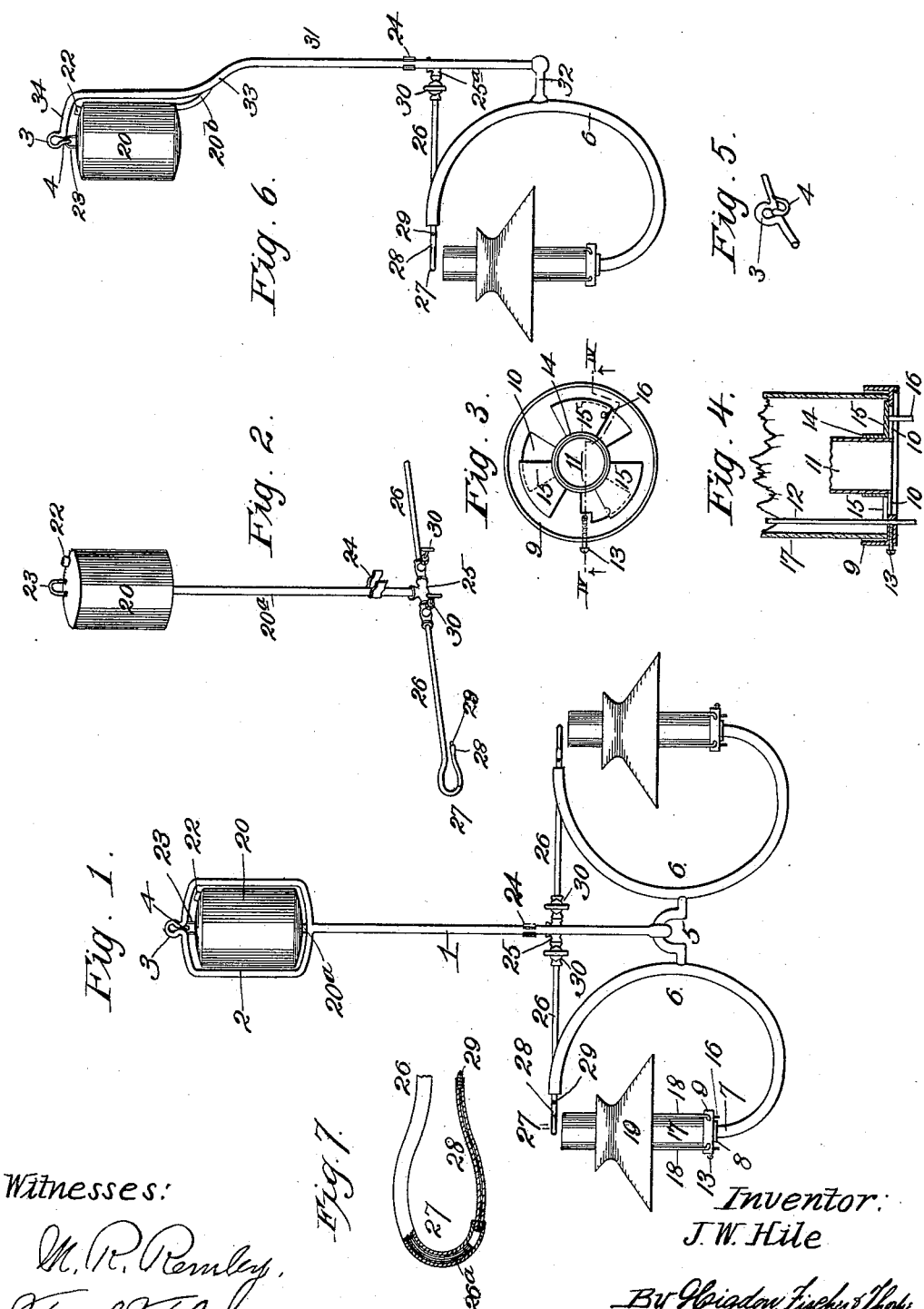
Witnesses:
M. R. Remley,
F. S. Thrasher
Inventor:
J. W. Hile
By Higdon, Fischer & Thorpe
Attys.

UNITED STATES PATENT OFFICE.

JOHN W. HILE, OF KANSAS CITY, KANSAS, ASSIGNOR TO HARRY M. EVANS, OF SAME PLACE.

GASOLENE-LAMP.

SPECIFICATION forming part of Letters Patent No. 618,940, dated February 7, 1899.

Application filed May 7, 1898. Serial No. 680,074. (No model.)

*To all whom it may concern:*

Be it known that I, JOHN W. HILE, of Kansas City, Wyandotte county, Kansas, have invented certain new and useful Improvements in Gasolene-Lamps, of which the following is a specification.

My invention relates to gasolene-lamps; and my object is to produce a lamp provided with a mantle of the "Welsbach" type, and therefore emitting a most pleasing and brilliant light, which can be operated with perfect safety and at a comparatively low cost.

To this end the invention consists in certain novel and peculiar features of construction and organization, as will be hereinafter described and claimed, and in order that the invention may be fully understood I will proceed to describe it, with reference to the accompanying drawings, in which—

Figure 1 represents in side elevation a double gasolene-lamp embodying my invention. Fig. 2 represents a perspective view of the gasolene-tank and conveying and generating tubes. Fig. 3 is a top plan view of the valve or register for controlling the volume of air passing up through the chimney, and consequently regulating the flame by permitting the suction of more or less air into the mixing-tube. Fig. 4 represents a section taken on the line IV IV of Fig. 3. Fig. 5 is a perspective view of the upper end of the suspension-rod of the chandelier or lamp frame. Fig. 6 is a side view of a single lamp embodying my invention. Fig. 7 is a sectional view of the gas-generating tube.

In the said drawings, 1 designates a center rod, which is formed with a comparatively large loop 2 of substantially rectangular configuration, by preference, and having an eye 3 at its upper end, and vertically above the body of the rod, and projecting laterally from said eye is an upwardly-disposed hook 4, formed integral with or secured to said eye. To the lower end of the rod is secured a cross-rod 5, preferably of inverted-U shape, and secured to the opposite ends of said cross-rod are the approximately semicircular mixing-tubes 6, located at opposite sides of the rod 1. The ends of the lower portions of said tubes project vertically upward and are provided with shoulders or collars 8.

9 designates a collar, commonly called the "gallery," provided with a series of openings 10, and 11 designates a vertical tube secured centrally to said gallery and adapted to fit snugly around the lower terminals of tube 6 and upon said collar 8, and said tube 11 is adapted to be provided with a foraminous burner-cap (not shown) of any suitable or preferred type.

12 designates the stem of the mantle, (not shown,) of the customary type, and 13 a set-screw carried by the gallery to impinge upon said stem and secure the mantle at the desired elevation with reference to the burner.

14 designates a collar which fits rotatably on the burner-tube 11 and is provided with a series of horizontal arms 15, which are adapted to cover in part or in whole the openings 10, and thus regulate the volume of air passing up through the chimney or cut it off altogether, and one of said arms is provided with a depending pin 16, by which the collar may be adjusted, and said pin may be utilized by striking against the edge of the opening 10, through which it projects, to limit the adjustment of said collar.

17 designates the chimney, mounted upon the gallery in the customary manner, and 18 rods secured to the gallery for the support of the shade as shown at 19 or of any other suitable or preferred type.

20 designates the gasolene-tank, fitting snugly within the loop 2 of rod 1 and having its supply-opening covered by the usual detachable cap 22. It is also provided at its upper end with the loop 23 for engagement with the hook 4, said loop being so disposed with relation to said cap that the latter when the tank is in operative position is vertically below the upper portion of the loop 2. This construction renders it very inconvenient to fill the tank without first detaching it from the hook 4 and therefore obviates danger of an explosion, caused generally by attempting to fill the tank while the stove or lamp is burning.

20ª, Figs. 1 and 2, designates the oil-tube depending from the lower end of the tank at one side of rod 1, and 24 a spring-clasp secured to said tube and adapted for quick engagement with or disengagement from said rod, so as to obviate any tendency of the tank to rock or swing upon the hook 4. The lower end of said tube is connected by a T-coupling 25 with a pair of parallel and oppositely-projecting tubes 26, and said tubes at points a slight distance from and vertically above the lamp-chimneys are bent back in form, preferably, of loops, as shown at 27. Said loops are completed by the communicating tubes 28, having fine passages to facilitate the vaporization of the oil, the terminals of said tubes being provided with removable plugs or nozzles 29, having exceedingly fine jet-orifices, through which the gas is discharged into the opposing ends of the mixing-tubes 6. The tubes 26 are preferably filled with wire $26^a$ to retard the flow of oil therethrough and prevent impurities which may be in the oil from reaching the communicating vaporizing-tubes 28, and the passages of said tubes 28 are so diminutive or fine that it takes but the flame of a match to generate therein sufficient gas to ignite the lamp, and the heat passing up through the chimney of the latter and impinging upon said tubes 28 keeps them so hot that the oil is converted into gas as long as it is permitted to flow, the valves 30 at the inner ends of tubes 26 serving to control the flow of oil through or to close the latter entirely to the passage of the oil.

In operation the oil is fed, of course, by force of gravity, and the valves are successively manipulated to permit the passage to the vaporizing-coils of only a small quantity of oil, and at the same time a lighted match is held so that its flame shall impinge upon the tube 28 of the coil. Before the match has burned out the oil is generated into gas and escapes under considerable pressure through the jet-orifice of plug 29 into the opposing tube 6, and in such action draws or sucks into said tube sufficient air to produce a combustible gas. By the time the air and vapor makes its exit from the opposite terminal of the comparatively long tube 6 it is thoroughly mixed and is ignited instantly by the flame of the match used in generating the gas. The flame from the lamp now of course continues this generating action as long as the supply of oil is kept up and an effective and pleasing light is produced at an operating cost of about one and a quarter cents for each eight hours of service. The flame is extinguished by simply cutting off the supply of oil by the manipulation of the proper valve.

When it is desired to fill the tank, it is operated pivotally on the hook 4, so as to disengage clasp 24 from rod 1 and swing the cap 22 from under the upper end of the loop 2. The tank may then be lifted off said hook. This operation is reversed in replacing the tank.

When an excess of air over vapor or gas is drawn into tube 6, the result is imperfect combustion and a red flame. To overcome this objection and insure a perfect combustion irrespective of the gas generated and discharged into the tube, I provide the adjustable collar 14 for regulating the volume of air passing up through the chimney. When the volume of air entering the mixing-tube with the gas is excessive, this collar is manipulated to admit air up through the openings 10 into the chimney externally of the burner, and the effect produced by the admission of air at this point is to reduce the volume drawn in at the upper end of the mixing-tube. Consequently the mixture of air and gas is more perfect and a more perfect combustion is obtained, a perfect combustion, of course, insuring the greatest efficiency at the minimum expense. The greater the exposure of the openings 10 the less air is drawn into the mixing-tubes 6, as will be readily understood.

Referring now to Fig. 6, it will be noticed that in lieu of rod 1 I employ a rod 31, connected at its lower end by a cross-bar 32 to the mixing-tube 6, and said rod at a suitable point is bent laterally, as at 33, over said tube, and near its upper end is bent, as at 34, so as to overhang the filling-cap of the tank 20. The bend 33 in the pipe is provided in order that the tank may be so disposed with relation to the lower part of the apparatus that they will balance each other either when the tank is filled or empty, and consequently maintain the lamp in a vertical position at all times. In consequence of the bend 33 of pipe 31 the oil-tube of the tank must also be bent, as shown at $20^b$, and in lieu of the T-coupling 25 at the lower end of said tube I employ an L-coupling, as shown at $25^a$. In all other respects the lamp is of precisely the same construction as the double tube already described.

From the above description it will be apparent that I have produced a gasolene-lamp which possesses the desirable features of simplicity and cheapness and which can be handled with safety, inasmuch as the attendant will find it easier to remove and fill the tank than to fill it when it is in position, which can be easily and quickly set up or dismantled, and by which the lamp can be set in operation with the flame of a match. Furthermore, it is to be understood that changes may be made in the form, proportion, detail construction, and arrangement of parts without departing from the spirit and scope or sacrificing any of the advantages of the invention.

Having thus described the invention, what I claim as new, and desire to secure by Letters Patent, is—

1. In a gasolene-lamp, a suspension-rod, carrying the mixing-tube and the lamp proper at its lower end, and provided with a laterally-projecting portion at its upper end, a tank attached to the upper end of said rod and provided with a filling-cap arranged beneath said laterally-projecting portion of the rod, a gasolene-tube depending from the tank and clasped to said rod, and a valve-controlled tube communicating with said gasolene-tube, and terminating in a vaporizing-coil which overhangs the lamp and has its discharge end opposite the receiving end of said mixing-tube, substantially as described.

2. A gasolene-lamp, comprising a rod carrying a mixing-tube and a lamp at its lower end, and provided with a laterally-extending portion at its upper end, terminating in a loop and a hook, a tank, provided with a loop for engagement with said hook, and with a filling-cap beneath said laterally-extending portion of the rod, a gasolene-tube extending downward from the tank, a spring-clasp securing it detachably to the rod, a valve-controlled tube connected to the lower end of the gasolene-tube and provided with a vaporizing-coil arranged vertically over the lamp; said vaporizing-coil terminating in a removable plug with a fine jet-orifice through which the vapor is discharged into the receiving end of the mixing-tube, substantially as described.

3. In a gasolene-lamp, a suspension-rod, provided with a loop at its upper end and a hook projecting laterally, and a tank fitting in said loop and hung upon said hook in such a manner that its filling-cap shall be below the upper end of the loop, substantially as described.

In testimony whereof I affix my signature in the presence of two witnesses.

JOHN W. HILE.

Witnesses:
M. R. REMLEY,
F. S. THRASHER.